(12) United States Patent
Dixit

(10) Patent No.: US 12,182,257 B2
(45) Date of Patent: Dec. 31, 2024

(54) SURFACING REASONS FOR ANOMALOUS MULTIVARIATE SESSIONS IN AUDIT AND SECURITY LOGS

(71) Applicant: Microsoft Technology Licensing, LLC, Redmond, WA (US)

(72) Inventor: Karishma Dixit, Cheltenham (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 533 days.

(21) Appl. No.: 17/308,698

(22) Filed: May 5, 2021

(65) Prior Publication Data

US 2022/0358212 A1    Nov. 10, 2022

(51) Int. Cl.
*G06F 21/55* (2013.01)
*G06N 20/00* (2019.01)
*G06N 3/0455* (2023.01)

(52) U.S. Cl.
CPC .......... *G06F 21/552* (2013.01); *G06N 20/00* (2019.01); *G06F 2221/034* (2013.01); *G06N 3/0455* (2023.01)

(58) Field of Classification Search
CPC ...... G06N 3/045; G06N 3/0455; G06N 20/00; G06F 2221/034; G06F 21/552
See application file for complete search history.

(56) References Cited

U.S. PATENT DOCUMENTS 10,873,456 B1 * 12/2020 Dods ..................... H04L 9/0822
11,537,902 B1 * 12/2022 Aydore .................. G06N 3/047
2017/0076217 A1 * 3/2017 Krumm .................. G06N 20/00
2019/0065738 A1 * 2/2019 Kim ....................... G06F 21/57
2020/0334680 A1 * 10/2020 Vanga ................... G06F 21/554
2020/0380531 A1 * 12/2020 Vaidya ................... G06N 3/088
2022/0156578 A1 * 5/2022 Allahdadian ........... G06F 17/18

(Continued)

OTHER PUBLICATIONS

Zhang, et al., "ACE—An Anomaly Contribution Explainer for Cyber-Security Applications", In Proceedings of International Conference on Big Data, Dec. 9, 2019, pp. 1991-2000. (Year: 2019).*

(Continued)

*Primary Examiner* — Bassam A Noaman
(74) *Attorney, Agent, or Firm* — Weaver IP L.L.C.

(57) ABSTRACT

Methods, systems, and computer program products are presented for classifying logged event data as anomalous. Multivariate input feature vectors based on event data are applied to an autoencoder model to generate corresponding predicted multivariate feature vectors with respective feature elements. Each feature element of each vector corresponds to a respective type of event data (e.g., sign-in failures). A reconstruction loss is determined for each predicted feature vector and used to classify the predicted feature vector as anomalous or not anomalous. Reason(s) for an anomaly classification are determined by selecting one or more feature elements based on a level of percent contribution to the vectors loss and underprediction or overprediction, determined for each feature element of the anomalous predicted feature vector. Each reason is related to the type of event associated with a selected feature element. The reasons may be displayed in a security analytics UI.

20 Claims, 9 Drawing Sheets

(56) References Cited

U.S. PATENT DOCUMENTS

2022/0303288 A1* 9/2022 Wang .................. H04L 63/1433
2022/0303796 A1* 9/2022 Zhang .................. H04L 41/0893

OTHER PUBLICATIONS

"International Search Report and Written Opinion Issued in PCT Application No. PCT/US22/024717", Mailed Date: Jul. 26, 2022, 11 Pages.

Zhang, et al., "ACE—An Anomaly Contribution Explainer for Cyber-Security Applications", In Proceedings of International Conference on Big Data, Dec. 9, 2019, pp. 1991-2000.

* cited by examiner

SURFACING REASONS FOR ANOMALOUS MULTIVARIATE SESSIONS IN AUDIT AND SECURITY LOGS

BACKGROUND

When cybercriminals attempt to gain initial access into a network, traces of their activity may be found in sign-in log data. If a cybercriminal manages to compromise a user undetected, they have the potential to cause significant damage and to access confidential information. Existing security detection logic that is coded for sign-in log data tends to be rule-based, with the aim of detecting specific known attacks (e.g., a password spray attack, where an attacker attempts to access a large number of accounts (e.g., usernames) with a few commonly used passwords). Other statistics-based detection performed on sign-in logs may determine the usual number of failed sign-ins for a user, and then issue an alert when there is a sudden spike in failures.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer readable mediums are disclosed herein for surfacing reasons for anomalous multivariate sessions in event logs. In one aspect, a method is performed in a computing device for providing reasons for classifying event data as anomalous. The method may comprise autoencoding a first multivariate input feature vector that has a plurality of feature elements based on a trained autoencoder model to generate a first output. Each feature element of the first multivariate input feature vector may correspond to a respective type of event data. A first predicted multivariate feature vector may be generated based on the first output and the first predicted multivariate feature vector may comprise feature elements that correspond to the feature elements of the first multivariate input feature vector. A reconstruction loss may be determined for the first predicted multivariate feature vector relative to the first multivariate input feature vector. In response to classifying the first predicted multivariate feature vector as anomalous based on the determined reconstruction loss, for each feature element of the first predicted multivariate feature vector, a percentage of contribution to the reconstruction loss may be determined. For each feature element of the first predicted multivariate feature vector, it may be determined whether the feature element is underpredicted or overpredicted. A feature element of the first predicted multivariate feature vector may be selected based on the determined percentage of contribution to the reconstruction loss, and/or upon the determination of whether the feature element was underpredicted or overpredicted. A reason for the anomalous classification of the first predicted multivariate feature vector that is based on the selected feature element may be returned. The reason may be displayed in a user interface (UI), (e.g., a security analytics UI).

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
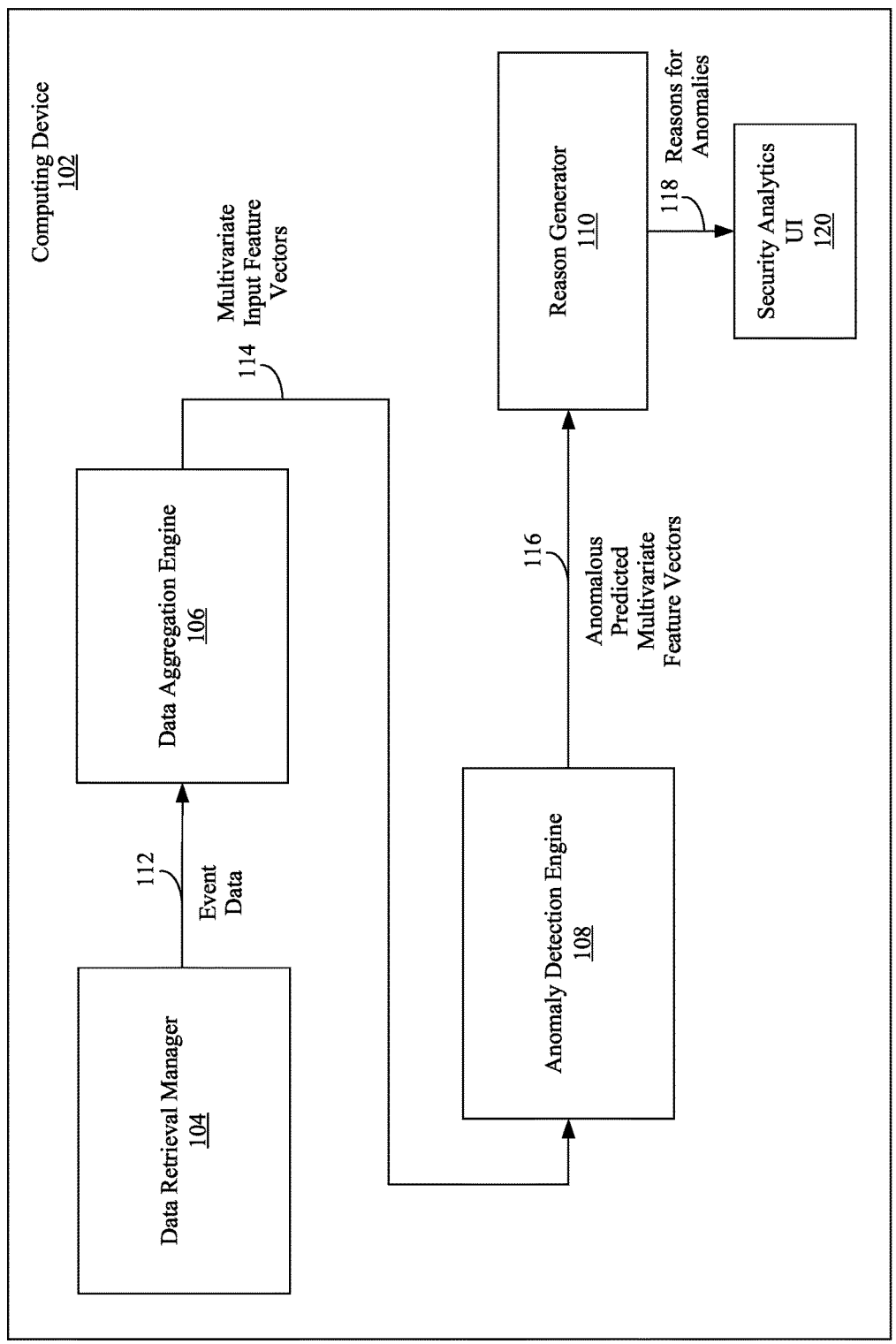
FIG. 1 is a block diagram of a system for detecting and providing reasons for anomalous activity in a computer system, according to an example embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the disclosed embodiments. The scope of the embodiments is not limited only to the aspects disclosed herein. The disclosed embodiments merely exemplify the intended scope, and modified versions of the disclosed embodiments are also encompassed. Embodiments are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

As described above, cybercriminals attempting to gain access into a network will often leave traces in sign-in log data. Similarly, various types of malicious activity occurring in a system or a service, either locally or in the cloud (e.g., in an application such as an email application, a text editor, a browser, etc.) may be detected using various types of event logs (e.g., sign-in logs, audit logs, security logs, heartbeat logs, etc.). The present disclosure is related to identifying anomalies in such event logs to expose types of activities that may be conducted by cybercriminals/adversaries. An unsupervised autoencoder model may be employed, which provides for additional explainability behind the surfaced anomalies for the end-user. For example, in a cyber security analytics user interface (UI), the additional information may provide the reasons for anomalous session data.

In some embodiments, sign-in log data may be aggregated according to multivariate sessions (e.g., sessions of a particular time period) on a per-user basis. Each session may comprise multiple features that each represent a particular type of event data (e.g., users sign-in data) collected in a computing system. For example, the per user event data may comprise the number of failed sign-ins per session, a distinct number of IP addresses utilized per session, a distinct number of operating systems utilized per session, etc. An autoencoder model may be trained on the sessions data, and as a trained autoencoder model, it may be utilized for compressing the sign-in sessions data into a bottleneck encoding. Then, a reconstruction process of the trained autoencoder model may be performed on the bottleneck encoding to attempt to reconstruct the input sessions data. Reconstructed (e.g., predicted or estimated) sessions data with high reconstruction errors may be considered to be anomalous. The trained autoencoder model output may be utilized to provide an anomaly score for each of the sessions. Use of the autoencoder model output, as described herein, may provide more particular reasons why a session is flagged as anomalous based on particular types of event data (e.g., event data triggered by user interactions, data transmissions, system operations, domain name systems (DNS) activity, execution of an application or other logic, a timer state, a threshold breach, etc.).

Earlier security detection methods for sign-in log data tend to be rule-based with the aim of detecting specific known attacks such as "password spray." Other statistics-based detections on sign-in logs, tend to be univariate rather than multivariate. The present multivariate approach, considers spikes in multiple features at a time (e.g., a number of failed sign-ins, a distinct number of countries originating sign-ins, a distinct number of operating systems utilized for sign-ins, etc.).

In general, use of autoencoder model output, as described herein, allows for providing particular reasons (e.g., the top N reasons) why a session is flagged as anomalous to an end-user (e.g., in a cyber security analytics UI) to indicate which events exhibited abnormal behavior during a session. In addition to event data being based on sign-in activity, the events (or features) may be based on various types of activities such as user interactions, data transmissions, system or service operations, execution of an application or other logic, etc. For each session scored by the system, an embodiment determines the percentage contribution from each event (or feature of the session) to the reconstruction error. The features contributing a high percentage of the reconstruction error, are likely to be the main reasons for a session being classed as anomalous.

In addition or alternatively to using percentage contribution to determine which features are significant or reasons behind the anomalous session, the system may utilize whether the autoencoding model has overpredicted or underpredicted the value for each feature. For example, eliminating candidate features that were overpredicted may compensate for when the autoencoder predicts too high a value for a feature, which may erroneously contribute a high percentage to the reconstruction error. An approach that combines percentage contribution with a method to compensate for such behavior may determine the significant reasons for an anomalous session based on: (1) percentage contribution to the reconstruction error for each feature, (2) did the model underpredict or overpredict each feature. Overprediction and/or underprediction may be determined by comparing feature values of the input session with corresponding feature values of the model's reconstructed (e.g., predicted) version of the session. For each feature, the system checks whether the reconstructed value is higher or lower than the original session value to determine overprediction or underprediction respectively.

The present disclosure describes embodiments for determining reasons for anomalous multivariate sessions in event logs. For example, FIG. 1 is a block diagram of a system 100 for detecting and providing reasons for anomalous activity in a computer system, according to an example embodiment.

As shown in FIG. 1, system 100 comprises a computing device 102, which includes a data retrieval manager 104, a data aggregation engine 106, an anomaly detection engine 108, a reason generator 110, and a security analytics user interface (UI) 120. Also shown in FIG. 1 are event data 112, multivariate input feature vectors 114, anomalous predicted multivariate feature vectors 116, and reasons for anomalies 118. System 100 is described in detail as follows. Multivariate input feature vectors 114 and anomalous predicted multivariate feature vectors 116 may be referred to as input feature vectors 114 and anomalous predicted feature vectors 116.

Although computing device 102 is shown as a single computing device in system 100, in some embodiments, system 100 may comprise one or more computing devices that may communicate via a network, where each computing device comprises a portion of the components shown in computing device 102. For example, data retrieval manager 104 and data aggregation engine 106 may reside in a first computing device, anomaly detection engine 108 and reason generator 110 may reside in a second computing device and security analytics UI 120 may reside in a third computing device. As described in more detail below with respect to FIG. 11, computing device(s) 102 may comprise any suitable computing device(s) and/or any suitable network interface controller of a computing device, such as a stationary computing device (e.g., a desktop computer or personal computer), a mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as an Apple iPhone, a phone implementing the Google® Android™ operating system; a Microsoft® Windows phone, etc.), a wearable computing device (e.g., a head-mounted device including smart glasses such as Google® Glass™, Oculus Rift® by Oculus VR, LLC, etc.), a gaming console/system (e.g., Nintendo Switch®, etc.), an appliance, a set top box, etc.

In an embodiment, system 100 may be configured to classify event data as anomalous. For example, each feature element of each multivariate input feature vector 114 may correspond to a respective type of event data 112. Each multivariate input feature vector of multivariate input feature vectors 114 may be processed by an autoencoder (described in more detail below) to generate a respective predicted multivariate feature vector. Each predicted multivariate feature vector may comprise feature elements corresponding to feature elements of its respective multivariate input feature vector 114. Anomaly detection engine 108 may be configured to classifying each predicted multivariate feature vector as anomalous or as not anomalous based on its reconstruction loss. One or more anomalous predicted multivariate feature vectors 116 may be output from anomaly detection engine 108. For each anomalous predicted multivariate feature vector 116, reason generator 110 may be configured to select a feature element as a likely cause for the anomalous classification.

Figure 2:
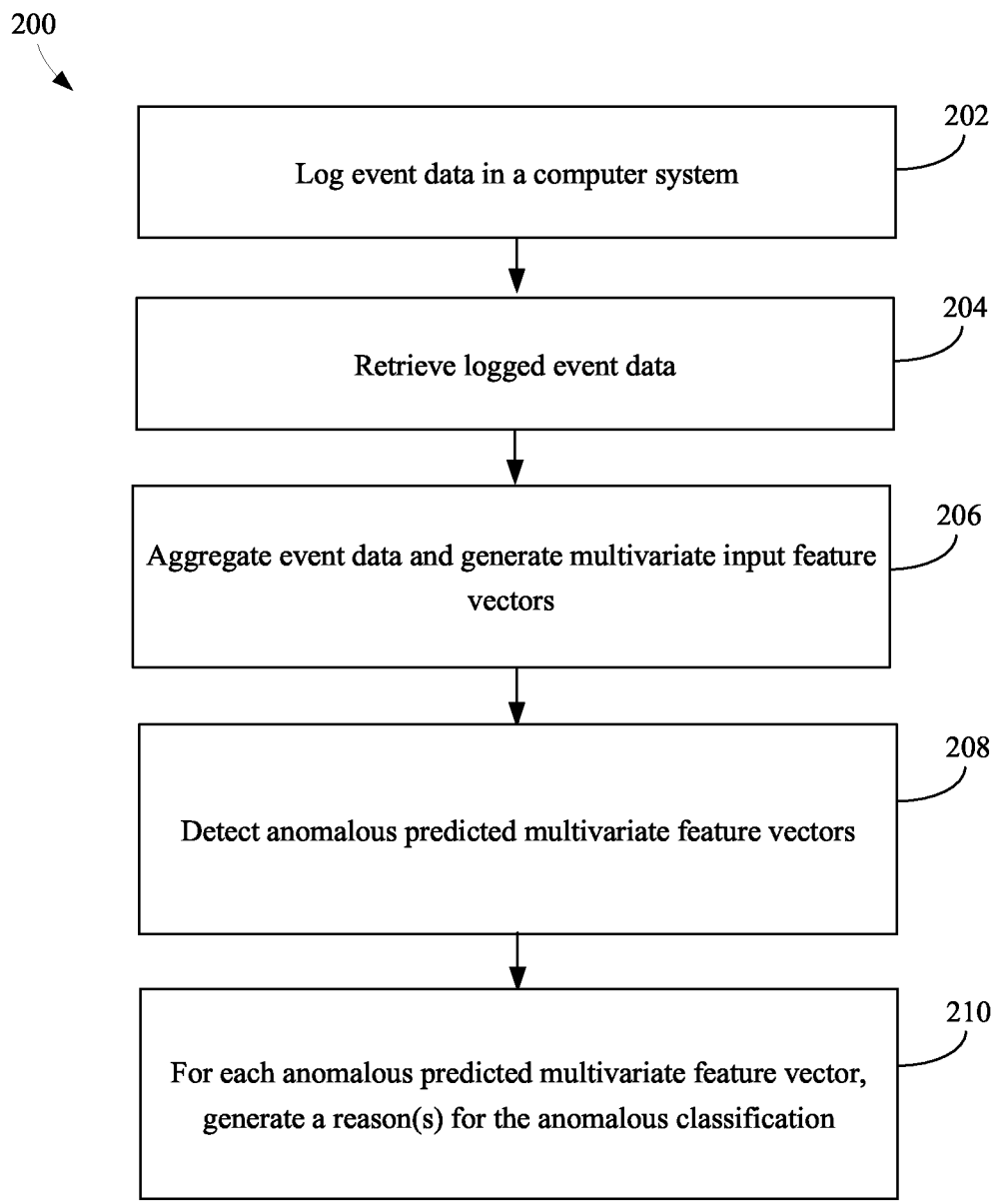
FIG. 2 is a flowchart of a method for detecting and providing reasons for anomalous activity in a computer system, according to an example embodiment.

Computing device(s) 102 may operate in various ways to perform its functions. For instance, FIG. 2 is a flowchart 200 of a method for detecting and providing reasons for anomalous activity in a computer system, according to an example embodiment. In an embodiment, computing device(s) 102 may operate according to flowchart 200. Flowchart 200 is described as follows with reference to FIGS. 1 and 3.

Figure 3:
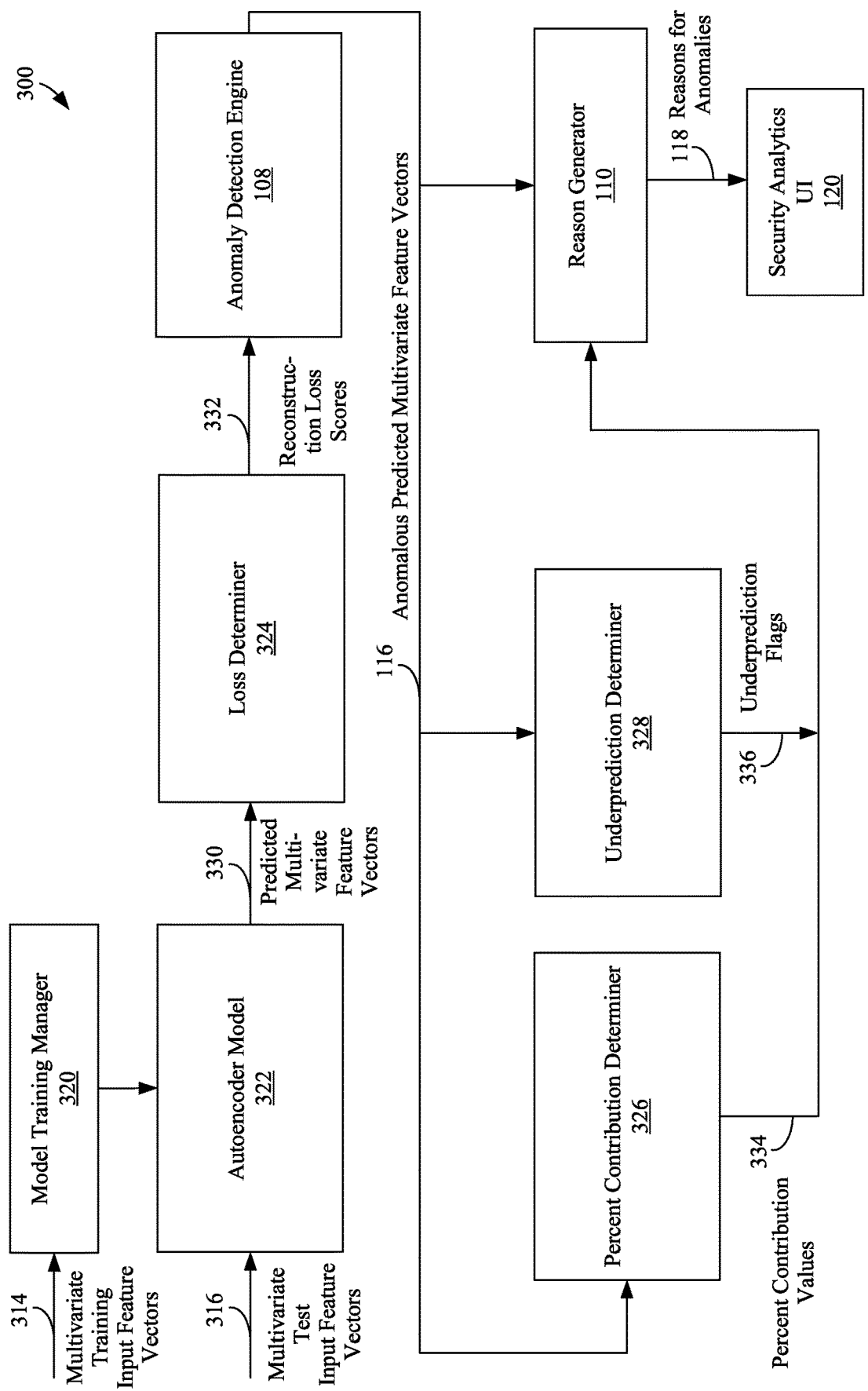
FIG. 3 is a block diagram of a system for predicting multivariate feature vectors based on autoencoded multivariate input feature vectors representing logged event data, and detecting and providing reasons for anomalies in the predicted multivariate feature vectors, according to an example embodiment.

FIG. 3 is a block diagram of a system 300 for predicting multivariate feature vectors based on encoded multivariate input feature vectors representing logged event data, and detecting and providing reasons for anomalies in the predicted multivariate feature vectors, according to an example embodiment. System 300 comprises a model training manager 320, an autoencoder model 322, a loss determiner 324, anomaly detection engine 108, a percent contribution determiner 326, an underprediction determiner 328, reason generator 110, and security analytics UI 120. Also shown in FIG. 3 are multivariate training input feature vectors 314, multivariate test input feature vectors 316, predicted multivariate feature vectors 330, reconstruction loss scores 332, anomalous predicted multivariate feature vectors 116, percent contribution values 334, underprediction flag 336, and reasons for anomalies 118. Multivariate training input feature vectors 314, multivariate test input feature vectors 316, predicted multivariate feature vectors 330, and anomalous predicted multivariate feature vectors 116 may be referred to as training input feature vectors 314, test input feature vectors 316, predicted feature vectors 330, and anomalous predicted feature vectors 116 respectively.

In some embodiments system 300 may be implemented in system 100. For purposes of illustration, system 300 is described as follows with respect to flowcharts 200 of FIG. 2 and flowcharts 400-1000 of FIGS. 4-10 respectively.

Flowchart 200 provides a high level overview of systems 100 and 300. Flowchart 200 begins with step 202. In step 202, event data is logged in a computing system. For example, as a user takes an action or logs into an operating system or an application of a computing system (e.g., a cloud computing system), (not shown), the operating system or application may monitor the user's actions and store characteristics of the user's actions in a log file. As described above, the logged event data may comprise any suitable type of event data logged in a computing system, such as event data based on user interactions, data transmissions, system or service operations, execution of an application or other logic, etc. In one embodiment, user sign-in data may comprise a count of failed sign-in attempts, a count of successful sign-in attempts, a count of countries the user signed-in from, a count of IP addresses a user signed-in from, a count of operating systems signed-in from, etc. In another embodiment, event data in an application and/or operating system may be logged. Examples of such logged event data may comprise a count of applications accessed, a duration an application is open, a count of email items accessed, a count of distinct email boxes accessed, IP addresses accessed, commands executed, a count of documents accessed, a count of heartbeats, etc. The event data may be streamed into various tables as new logging data arrives. Each event data element (e.g., a count) may be associated with other information in the tables, such as a user identifier (ID), a time stamp, an organization account ID (e.g., a company ID), IP address, application ID, etc.

In step 204, logged event data may be retrieved. For example, data retrieval manager 104 may be configured to receive event data from various operating system or application logs in a computing system (e.g., a cloud computing system), and output event data 112 to data aggregation engine 106.

In step 206, event data may be aggregated and multivariate input feature vectors may be generated. For example, data aggregation engine 106 may be configured to define features based on the logged event data that is collected over a time interval. Each feature element in a multivariate feature vector may represent a type of event data such as a count of login failures, a count of IP addresses utilized, etc. from sign-in logs, or a count of email items accessed, a count of distinct email boxes accessed, etc. from logs of an email application. The features may be represented as elements in multivariate vectors (or multivariate time series vectors) that may be input and processed by autoencoder model 322. Each element of an input feature vector may comprise a value associated with a type of event or logged activity.

In step 208, anomalous predicted feature vectors may be detected. As described in more detail below, model training manager 320 (FIG. 3) may be configured to train autoencoder model 322. Trained autoencoder model 322 may be configured to autoencode a plurality of test input feature vectors 316 and generate a plurality of respective predicted (or reconstructed) feature vectors 330. Loss determiner 324 may be configured to determine a reconstruction loss score 332 (also referred to as a prediction error or an anomaly score) for each of the predicted feature vectors 330. The reconstruction loss may indicate an error in the prediction or reconstruction of a predicted feature vector. Anomaly detection engine 108 may be configured to determine which predicted feature vectors 330 are anomalous based on a difference between values of a predicted feature vector 330 relative to values of a respective input test feature vector 316.

In step 210, for each anomalous predicted feature vector, a reason or reasons may be generated for the anomalous classification. For example, reason generator 110 may be configured to determine a reason for each anomalous predicted feature vector 116 and return one or more reasons for anomalies 118 for consumption by an end user. The reasons for anomalies 118 may be determined based on percent contributions to the reconstruction loss of a predicted feature vector 330 by individual feature elements of the predicted feature vector 330 and a determination of whether each feature element was overpredicted or underpredicted. In some embodiments, reasons for anomalies 118 may be returned to an event hub that may buffer the reasons or may be directly streamed to a UI such as security analytics UI 120. Security analytics UI may be configured to utilize reasons for anomalies 118 to present reasons for anomalous sessions and/or statistical information regarding anomalous behavior (e.g., anomalous user behavior) in the computer systems that provided the event data 112.

Figure 4:
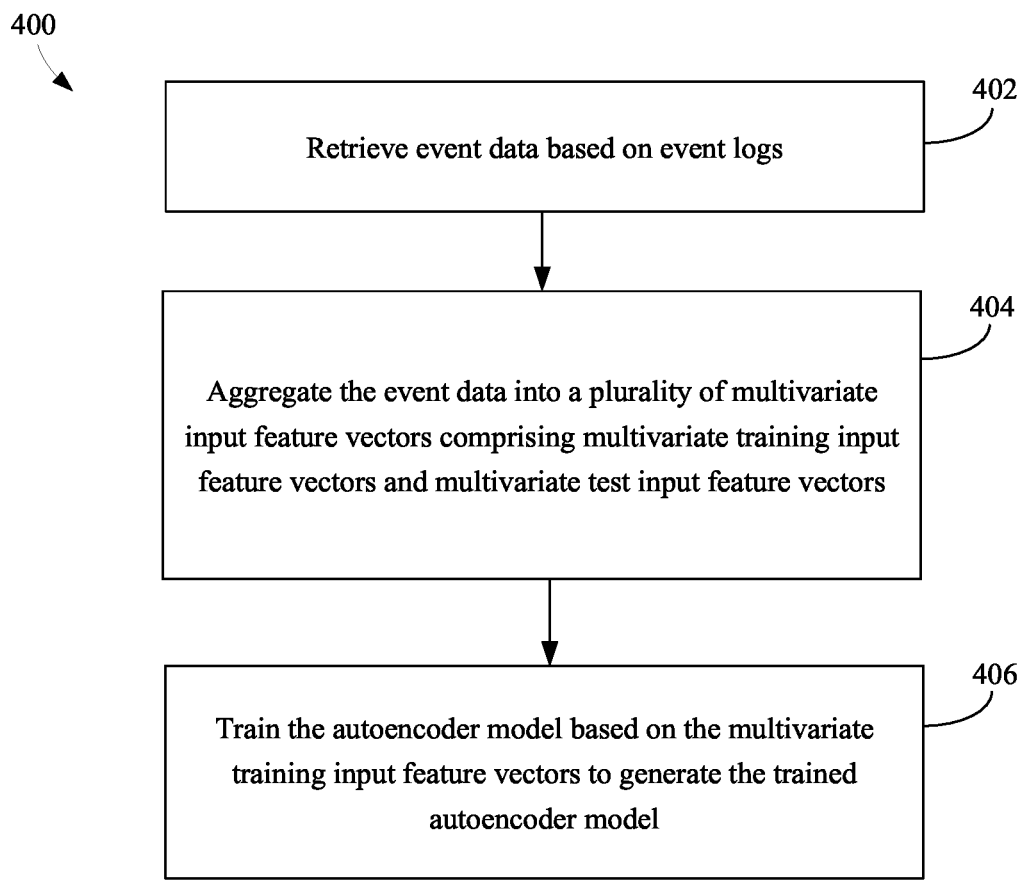
FIG. 4 is a flowchart of a method for collecting event data and featurization of the data, according to an example embodiment.

Data retrieval manager 104 and data aggregation engine 106 may operate in various ways to perform their functions. For instance, FIG. 4 is a flowchart of a method for collecting event data and featurization of the data, according to an example embodiment. In some embodiments, flowchart 400 may be performed as part of flowchart 200 (FIG. 2), such as after step 202. In an embodiment, data retrieval manager 104 and data aggregation engine 106 may operate according to flowchart 400. Flowchart 400 is described as follows with reference to FIGS. 1 and 3.

Flowchart 400 begins with step 402. In step 402, event data may be retrieved based on event logs. For example, data retrieval manager 104 may be configured to receive event data from various operating system or application logs of a computing system (not shown), such as a cloud computing system or other computer system, and output event data 112 to data aggregation engine 106. In one embodiment, data retrieval manager 104 may schedule a job (e.g., utilizing a PySpark backend or another application programming interface (API)), to read one or more days of event data from cloud or other resources. The event data may come from different sources. For example, one job may read sign-in logs and another job may read logs of a productivity application or an operating system. Data retrieval manager 104 may be configured to periodically (e.g., daily) read data from across a plurality of accounts (e.g., customer accounts and/or user accounts), to obtain the logged data, and may read multiple days' worth of data at a time. In one example, data retrieval manager 104 may schedule a daily reading of data that was logged over a window of time (e.g., the 8 most recent days). However, the disclosure is not limited with regard to any specific methods or schedules for retrieving the logged event data and any suitable methods or schedules may be utilized. In one embodiment, a portion of the event data may be utilized as training data for autoencoder model 322, and another portion may be utilized as test data, which may be applied to the trained autoencoder model 322. In some embodiments, filters may be applied to select event data 112 pertaining to a particular application, a particular group of users (e.g., users that are part of a particular company's account), or for particular type of user (e.g., admin users vs regular users).

In step 404, event data may be aggregated into a plurality of multivariate input feature vectors 114 that may comprise multivariate training input feature vectors 314 and multivariate test input feature vectors 316. For example, data aggregation engine 106 may be configured to define various feature elements based on different types of event data that is collected over a time interval. The length of the time interval may vary (e.g., 10 minutes, 1 hour, etc.) depending on characteristics of the data, or which source provided the logged event data. Data aggregation engine 106 may be configured to organize the features into sessions where each session may comprise aggregated counts (feature elements) in a plurality of features over the time interval. Data aggregation engine 106 may be configured to associate an entity type (e.g., user, IP address, application, cloud service, device, etc.) with each session. For example, data from sign-in logs may be aggregated by user ID to create per-user sessions, data from DNS logs may be aggregated by IP address to create per-IP address sessions, data from logs of a cloud service may be aggregated by cloud application ID to create per-cloud application sessions, and so on. In one embodiment, a user identifier may be associated with a plurality of 10 minute sessions within a days' worth of collected data. Multivariate input feature vectors 114 may be created for each session, where each feature element of an input feature vector 114 may comprise a value associated with a type of event or activity. For example, an input feature vector 114 that represents logged sign-in data for a particular user, over a 10 minute session, may comprise a count of 6 failed sign-in attempts by the user over the 10 minute interval, a count of 1 country that the user logged-in from over the 10 minute time interval, and a count of 2 IP addresses the user signed-in from over the 10 minute interval. An example of an input feature vector 114 for such a session may be represented as [6, 1, 2] where the numbers 6, 1, and 2 are feature elements of the input feature vector 114. In some embodiments, a session may be represented by a plurality of input feature vectors 114 as a multivariate time series. A multivariate time series session may comprise a list of lists, where each list represents a feature vector for a given point in time. For example, a multivariate time series may comprise three lists, such as [[3, 1, 1, 0, 5], [2, 1, 1, 0, 0], [0, 2, 1, 1, 4]], where the first list [3, 1, 1, 0, 5] may comprise a feature vector corresponding to 2:00 pm, the second list [2, 1, 1, 0, 0], may comprise a feature vector corresponding to 2:01 pm, and the third list [0, 2, 1, 1, 4] may comprise a feature vector corresponding to 2:02 pm. Respective values in each of the three lists may correspond to the same feature names (e.g., [failed sign-ins, IP address, operating systems, incorrect passwords, successful sign-ins]). Each input feature vector 114 may comprise any suitable number of feature elements (e.g., 5, 10, 100, 1000, etc.) In addition to, or alternatively to associating a session with a user identifier, sessions may be organized based on other groups or categories. For example, each session may be associated with a user identifier and an associated company identifier such that the sessions may be grouped by company, and within the company, by user. The plurality of input feature vectors 114 may comprise a plurality of training input feature vectors 314 and a plurality of testing input feature vectors 316. For example, in one embodiment, data retrieval manager 104 may be configured to retrieve the most recent 8 days of logged event data from a computer system, and may aggregate the 8 days of event data into a plurality of input feature vectors 114. The portion of input feature vectors 114 that were created from the first seven days' worth of retrieved event data may be utilized as training input feature vectors 314, and the portion of input feature vectors 114 that were created from the event data retrieved on the eighth day may be utilized as test input feature vectors 314.

In step 406, an autoencoder model may be trained based on the multivariate training input feature vectors to generate the trained autoencoder model. For example, autoencoder model 322 may comprise a neural network with an encoding portion and a decoding portion having a plurality of weights. In one exemplary embodiment, a backpropagation algorithm may be utilized to train the weights of autoencoder model 322. Training manager 320 may be configured to receive training input feature vectors 314 from data aggregation engine 106, and apply training input feature vectors 314 to autoencoder model 322 to iteratively update the weights of the model. In some embodiments, the a portion of training input feature vectors 314 may be utilized as a validation set, where model training manager 320 may be configured to apply the validation input feature vectors intermittently and detect when autoencoder model 322 may overfit on the training input feature vectors 314 and determine when to end the training process for a set of data. In some embodiments, autoencoder model 322 may be trained for a particular group of users. For example, autoencoder model 322 may be trained based on training input feature vectors 314 that are associated with a group of users associated with a particular company identifier for autoencoding one set of test input feature vectors 316, and then trained on a different set of training input feature vectors 314 that are associated with a different company identifier for autoencoding a second set of test input feature vectors 316.

Figure 5:
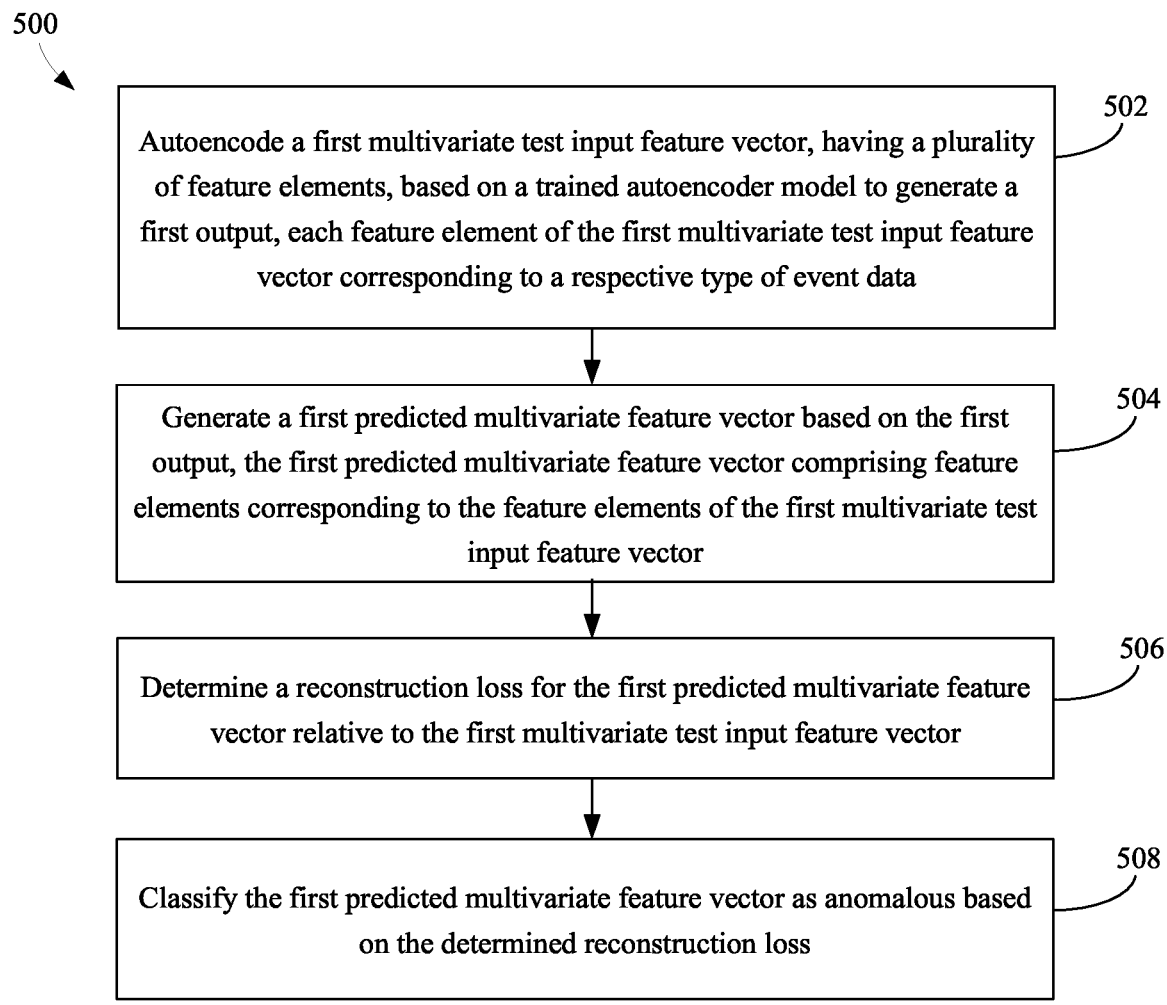
FIG. 5 is a flowchart of a method for autoencoding a multivariate input feature vector that represents event data of a session, to generate a predicted multivariate feature vector and classify the predicted multivariate feature vector as anomalous, according to an example embodiment.

Autoencoder model 322, loss determiner 324 and anomaly detection engine 108 may operate in various ways to perform their functions. For instance, FIG. 5 is a flowchart 500 of a method for autoencoding a multivariate input feature vector that represents event data of a session, to generate a predicted multivariate feature vector, and classifying the predicted multivariate feature vector as anomalous, according to an example embodiment. Flowchart 500 may be performed as part of flowchart 200 (FIG. 2), such as after step 206, and/or after step 406 of flowchart 400 (FIG. 4). In an embodiment, autoencoder model 322, loss determiner 324, and anomaly detection engine 108 may operate according to flowchart 500. Flowchart 500 is described as follows with reference to FIGS. 1 and 3.

Figure 6:
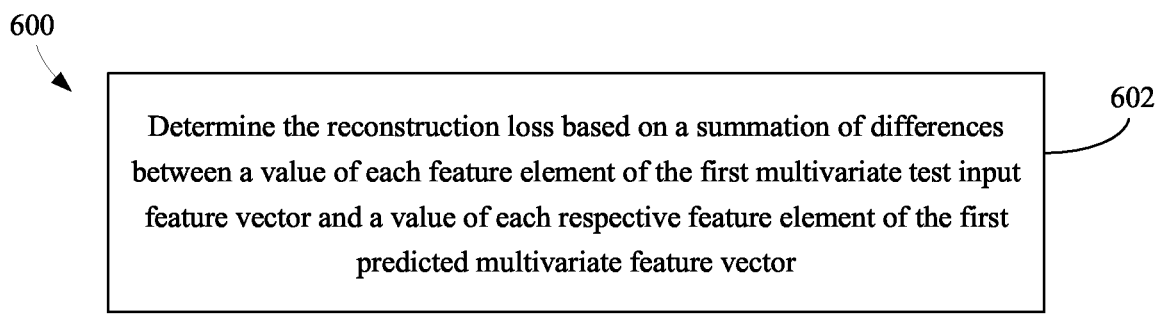
FIG. 6 is a flowchart for determining reconstruction loss of a multivariate feature vector, according to an example embodiment.

Flowchart 600 may be performed as part of flowchart 500, such as during step 506. FIG. 6 is a flowchart 600 for determining reconstruction loss of a multivariate feature vector, according to an example embodiment.

Flowchart 500 includes step 502. In step 502, a first multivariate test input feature vector, having a plurality of feature elements, may be autoencoded based on a trained autoencoder model to generate a first output, where each feature element of the first multivariate test input feature vector may correspond to a respective type of event data. For example, each of a plurality of test input feature vectors 316 may comprise a specified number of feature elements where each element corresponds to an event or type of activity (e.g., a count of failed sign-in logs, a count of number of IP addresses signed in from, etc.). A test input feature vector of the plurality of test input feature vectors 316 may be referred to as a first test input feature vector 316, and a predicted feature vector of the plurality of predicted feature vectors 330 may be referred to as a first predicted feature vector 330. A trained autoencoder model 322 may be configured to: receive a first test input feature vector 316 of the plurality of test input feature vectors 316, autoencode the first test input feature vector 316 into a bottleneck feature vector with a fewer number of feature elements, and then attempt to reconstruct (e.g., estimate or predict) the first test input feature vector 316 from the bottleneck feature vector, to generate an output (e.g., a first predicted feature vector 330).

In step 504, a first predicted multivariate feature vector may be generated based on the first output, where the first predicted multivariate feature vector may comprise feature elements corresponding to the feature elements of the first multivariate test input feature vector. For example, the output from autoencoder model 322 may comprise a first predicted feature vector 330 of the plurality of predicted feature vectors 330. Each of the plurality of predicted feature vectors 330 may comprise the same number of feature elements as each of the respective test input feature vectors 316. Moreover, each feature element of a predicted feature vector 330 may correspond to the same event data 112 as a respective feature element of a corresponding test input feature vector 316. For example, the first test input feature vector 316 and the first predicted feature vector 330 may have the same number of feature elements and each feature element of the first predicted feature vector 330 may comprise an estimation of a respective feature element in the first test feature vector 316 that is determined based on the feature elements of the bottleneck feature vector.

In step 506, a reconstruction loss may be determined for the first predicted multivariate feature vector relative to the first multivariate test input feature vector. For example, loss determiner 324 may be configured to compare first predicted feature vector 330 to first test input feature vector 316 and generate a reconstruction loss value (or anomaly score) for first predicted feature vector 330 based on the comparison. Similarly, loss determiner 324 may be configured to compare each predicted feature vector 330 of the plurality of predicted feature vectors 330 to a respective test input feature vector 316, to determine a reconstruction loss value for each predicted feature vector 330 of the plurality of predicted feature vectors 330. In this regard, in one embodiment, for first predicted feature vector 330, loss determiner 324 may be configured to determine the difference between each feature element of the first predicted feature vector 330 to a respective feature element in corresponding first test input feature vector 316, and sum the differences from each pair of feature elements to output a reconstruction loss value 332 for the first predicted feature vector 330. For example, referring to FIG. 6, in step 602, the reconstruction loss value 332 may be determined based on a summation of differences between a value of each feature element of the first multivariate test input feature vector 316 and a value of each respective feature element of the first predicted multivariate feature vector 330. In one example, a first test input feature vector 316 may comprise feature elements [$x_0, x_1, x_2, x_3, x_4$, $x_5, x_6, x_7$]=[2, 1, 0, 2, 0, 1, 7, 1], and a corresponding first predicted feature vector 330 may comprise respective feature elements [$y_0, y_1, y_2, y_3, y_4, y_5, y_6, y_7$]=[2, 1, 0, 1.1, 0, 0.9, 6, 1]. The reconstruction loss value for the first predicted feature vector 330 may be determined as $\Sigma(x_i - y_i)$, where i=1 to n. Therefore, in this example, the reconstruction loss may comprise:

$$(2-2)+(1-1)+(0-0)+(2-1.1)+(0-0)+(1-0.9)+(7-6)+(1-1)=2.0$$

However, the disclosure is not limited with respect to any specific method for determining the reconstruction loss for a predicted feature vector 330, and any suitable method may be utilized.

Referring back to FIG. 5, in step 508, the first predicted multivariate feature vector may be classified as anomalous based on the determined reconstruction loss. For example, the reconstruction loss determined for the first predicted feature vector 330 may be compared to an anomaly threshold, and based on the relationship of the reconstruction loss of the first predicted feature vector 330 and the anomaly threshold, the first predicted feature vector 330 (and thus the corresponding first test input feature vector 316) may be classified as anomalous (e.g., if reconstruction loss for the first predicted feature vector 330 is greater than or equal to the anomaly threshold, then the first predicted feature vector feature vector 330 may be classified as anomalous, and if it is less than the anomaly threshold, the first predicted feature vector may not be classified as anomalous). In a similar manner as this, each predicted feature vector 330 of the plurality of predicted feature vectors 330 may be classified as anomalous or not anomalous.

Figure 7:
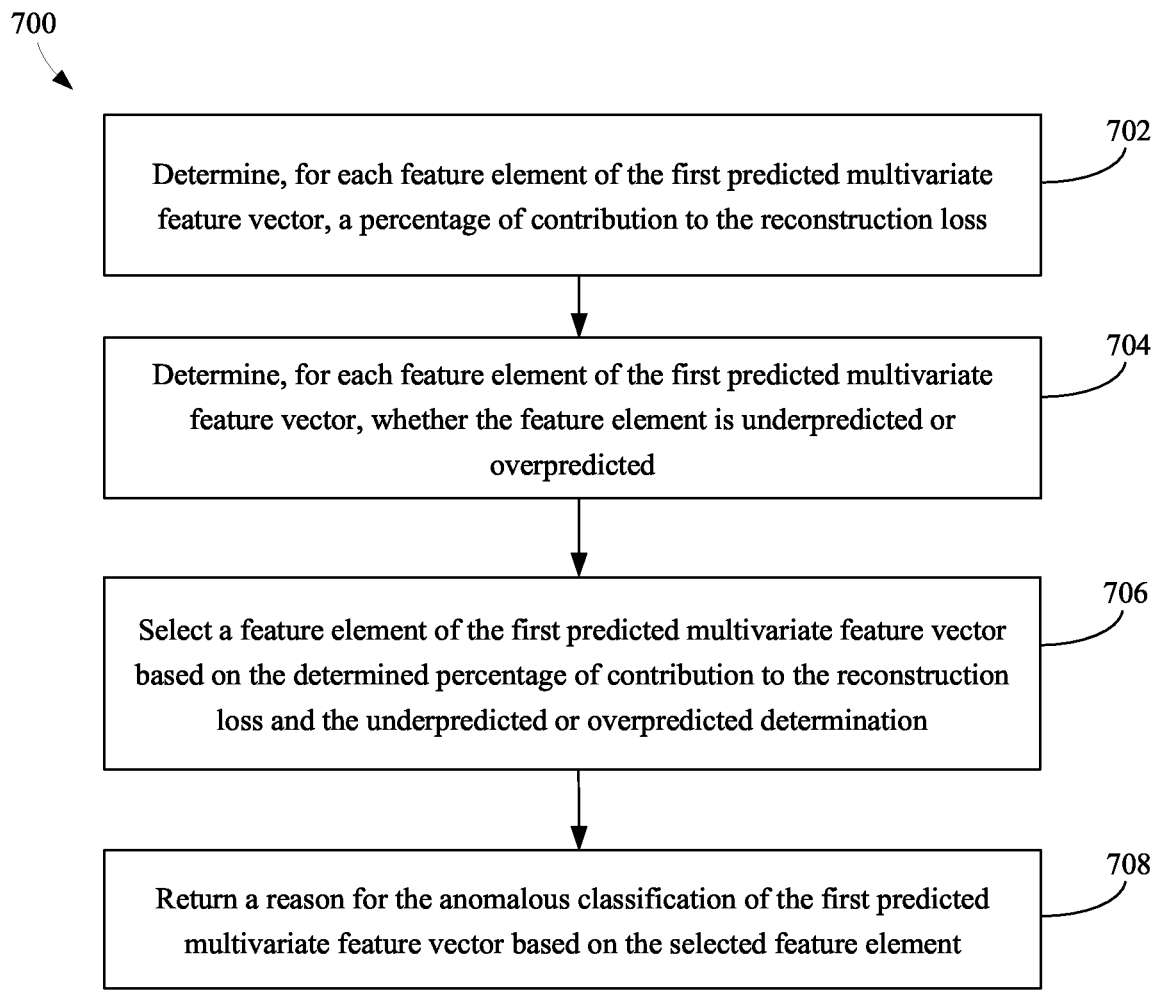
FIG. 7 is a flowchart of a method for determining reasons for anomalous sessions, according to an example embodiment.

Percent contribution determiner 326, underprediction determiner 328, and reason generator 110 may operate in various ways to perform their functions. For instance, FIG. 7 is a flowchart 700 of a method for determining reasons for anomalous sessions, according to an example embodiment. Flowchart 700 may be performed as part of flowchart 200 (FIG. 2), such as after step 208, and as part of flowchart 500 (FIG. 5), such as after step 508. In an embodiment, percent contribution determiner 326, underprediction determiner 328, and reason generator 110 may operate according to flowchart 700. Flowchart 700 is described as follows with reference to FIGS. 1 and 3.

Figure 8:
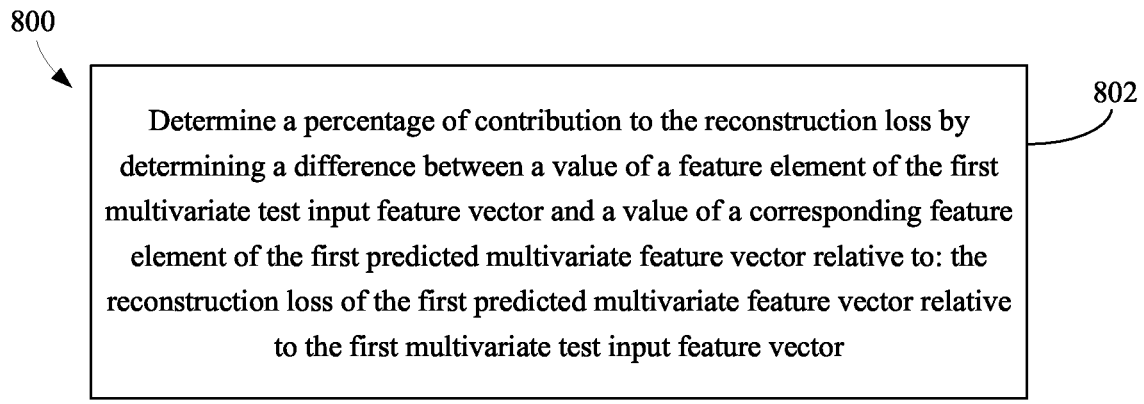
FIG. 8 is a flowchart for determining the percentage of a multivariate feature vector reconstruction loss contributed by a particular feature element of a multivariate feature vector, according to an example embodiment.

FIG. 8 is a flowchart 800 for determining the percentage of a multivariate feature vector reconstruction loss contributed by a particular feature element of a multivariate feature vector, according to an example embodiment. Flowchart 800 may be performed as part of flowchart 700, such as during step 702.

Figure 9:
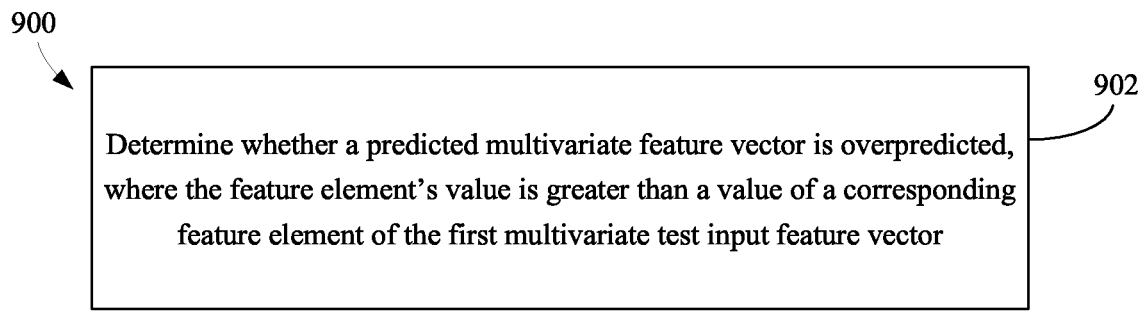
FIG. 9 is a flowchart for determining whether a predicted multivariate feature vector is overpredicted or underpredicted, according to an example embodiment.

FIG. 9 is a flowchart 900 for determining whether a predicted multivariate feature vector is overpredicted or underpredicted, according to an example embodiment. Flowchart 900 may be performed as part of flowchart 700, such as during step 704.

Flowchart 700 includes step 702. In step 702, for each feature element of the first predicted multivariate feature vector, a percentage of contribution to the reconstruction loss of the first predicted multivariate feature vector is determined. For example, for each feature element of the first predicted feature vector 330, percent contribution determiner 326 may be configured to compare a per feature element reconstruction loss value to the value of reconstruction loss value 332 (of the whole first predicted feature vector 330), to arrive at a percentage of contribution value 334 for each of the feature elements of the first predicted feature vector 330. Referring to flowchart 800, in step 802, percent contribution determiner 326 may be configured to determine a percentage of contribution value 334 to the reconstruction loss 332 for a feature element of the first predicted multivariate feature vector 330, by determining a difference between a value of the feature element of the first predicted multivariate feature vector 330 and a value of a respective feature element of the corresponding first multivariate test input feature vector 316, and comparing the difference to the reconstruction loss of the first predicted multivariate feature vector 330 (e.g., dividing a per feature element reconstruction loss by a reconstruction loss 332 of the entire first predicted multivariate feature vector 330). In this regard, using the same example feature vectors as used above for flowchart 600, step 602, where the first test input feature vector 316 comprises the values [2, 1, 0, 2, 0, 1, 7, 1], the corresponding first predicted feature vector 330 comprises the values [2, 1, 0, 1.1, 0, 0.9, 6, 1], and the reconstruction loss=2.0 for the first predicted feature vector 316. The percent contribution values 334 ($p_i$) for each feature element ($y_i$) of the first predicted feature vector 330 may comprise:

$$(2-2)/2.0=0$$

$$(1-1)/2.0=0$$

$$(0-0)/2.0=0$$

$$(2-1.1)/2.0=0.45$$

$$(0-0)/2.0=0$$

$$(1-0.9)/2.0=0.05$$

$$(7-6)/2.0=0.5$$

$$(1-1)/2.0=0$$

or:

$$[p_0,p_1,p_2,p_3,p_4,p_5,p_6,p_7]=[0,0,0,0.45,0,0.05,0.5,0].$$

In a similar manner as this, a percent contribution value 334 may be determined for each feature element of each predicted feature vector 330 of the plurality of predicted feature vectors 330.

In step 704, for each feature element of the first predicted multivariate feature vector, determine whether the feature element is underpredicted or overpredicted. For example, underprediction determiner 328 may be configured to determine whether each feature element of the first predicted feature vector 330 is underpredicted or overpredicted, and may assign an underprediction flag 336 ($f_i$) to each feature element. It may be determined whether a particular predicted feature element ($y_i$) is underpredicted or overpredicted based on a relationship between the value of the predicted feature element ($x_i$) relative to the value of the respective feature element ($y_i$) of the corresponding test input feature vector. In one example, referring to flowchart 900 of FIG. 9, in step 902, underprediction determiner 328 may be configured to determine whether a feature element of the first predicted multivariate feature vector 330 is overpredicted where the feature element's value is greater than a value of a respective feature element of the first multivariate test input feature vector 316. In this example, a predicted feature element may be underpredicted if its value is less than or equal to the value of the respective feature element of the first test input feature vector 316. In one embodiment, using the same example feature vectors as used above for flowchart 600, step 602, where the first test input feature vector 316 comprises the values [2, 1, 0, 2, 0, 1, 7, 1] and the corresponding first predicted feature vector 330 comprises respective values [2, 1, 0, 1.1, 0, 0.9, 6, 1], an underprediction flag 336 may be set to 1 if a predicted feature element value is underpredicted (e.g., predicted feature element value<=input feature element value), and set to 0 if the predicted feature element value is overpredicted (e.g., predicted feature element value>input feature element value) for each feature element of first predicted feature vector 330. Since all of the predicted feature elements of first predicted feature vector 330 are less than or equal to the respective input feature elements of first test input feature vector 316, all of the underprediction flags 336 are equal to 1 (true), as follows:

$$[f_0, f_1, f_2, f_3, f_4, f_5, f_6, f_7] = [1,1,1,1,1,1,1,1].$$

In a similar manner as this, for each feature element of each predicted feature vector 330 of the plurality of predicted feature vectors 330, it may be determined whether the feature element is underpredicted or overpredicted.

In step 706, a feature element of the first predicted multivariate feature vector is selected based on the determined percentage of contribution to the reconstruction loss and the underpredicted or overpredicted determination. For example, using the same example feature vectors as used above for flowchart 600, step 602:

first test input feature vector 316 comprises:

$$[x_0, x_1, x_2, x_3, x_4, x_5, x_6, x_7] = [2,1,0,2,0,1,7,1],$$

corresponding first predicted feature vector 330 comprises:

$$[y_0, y_1, y_2, y_3, y_4, y_5, y_6, y_7] = [2,1,0,1.1,0,0.9,6,1],$$

percent contribution values 334 per feature element comprise:

$$[p_0, p_1, p_2, p_3, p_4, p_5, p_6, p_7] = [0,0,0,0.45,0,0.05,0.5,0],$$ and underprediction flags per feature element comprise:

$$[f_0, f_1, f_2, f_3, f_4, f_5, f_6, f_7] = [1,1,1,1,1,1,1,1],$$

Reason generator 110 may be configured to select a feature element $y_i$ of first predicted feature vector 330 (or a respective $x_i$ of first test input feature vector 316) based on a respective percent contribution value ($p_i$) 334, and a respective under prediction flag 336 ($f_i$). A selected feature element of the first predicted feature vector 330 may indicate that the logged event (or activity in a computer system associated with the event) represented by the selected feature element is a significant reason for anomalous classification of the first predicted feature vector (or a corresponding first test input feature vector 316), and is thus a reason why a corresponding first session is classified as anomalous. In a manner similar to this method described for the first predicted feature vector 330, one or more such selected feature elements of any predicted feature vector 330 classified as anomalous, may indicate respective one or more reasons for the anomalous classification of the predicted feature vector 330 (or a corresponding test input feature vector 316).

In some embodiments, reason generator 110 may be configured to determine which of the percent contribution values 334 of a first predicted feature vector 330 to select for a reason, by comparing each percent contribution value 334 (e.g., $p_i$) of the first predicted feature vector 330 to a reason threshold. In some embodiments, reason generator 110 may be configured to sort the percent contribution values 334 (e.g., based on increasing percentage values) of the first predicted feature vector 330, and select a candidate set of percent contribution values 334 based on their relationship to the reason threshold (e.g., a percent contribution value 334 greater than the reason threshold may indicate a candidate reason for an anomaly classification of the first predicted feature vector 330). In instances where a percent contribution value 334 is greater than (or equal to) the reason threshold, and the underprediction flag is set to 1 (e.g., the feature element was underpredicted) for a particular feature element, the feature element may be selected as indicating a significant reason for an anomaly classification of the first predicted feature vector. However, in an instance where the percent contribution value 334 is greater than (or equal to) the reason threshold, but the underprediction flag is set to 0 (e.g., the predicted feature element was overpredicted) for a particular feature element of the first predicted feature vector 330, the feature element may not be selected as indicating a significant reason for the anomaly classification of the first predicted feature vector 330, since the percent contribution value 334 was erroneously predicted too high. In a manner similar to this method described for the first predicted feature vector 330, one or more such selected feature elements of any predicted feature vector 330 classified as anomalous, may indicate respective one or more reasons for the anomalous classification of predicted feature vector 330 (or a corresponding test input feature vector 316).

In step 708, a reason for the anomalous classification of the first predicted multivariate feature vector is returned based on the selected feature element. For example, the selected feature element (or a plurality of selected feature elements) of first predicted feature vector 330 may comprise information of reasons for anomalies 118. Reasons generator 110 may be configured to store reasons for anomalies 118 and/or transmit the reasons for display in security analytics UI 120. As described above, each feature element of a predicted feature vector 330 (or corresponding test input feature vector 316) may correspond to a respective logged event. In the above example, the feature element of first predicted feature vector 330 having an index of 3 ($y_3$), corresponds to percentage contribution ($p_3$), which has a percent contribution value 334 of 0.45. This feature element ($y_3$) may further correspond to event data representing, for example, a number of failed sign-in attempts. The feature element with an index of 6 ($y_6$) corresponds to the percentage contribution ($p_6$) having percentage contribution value 334 of 0.5, which may further correspond to event data comprising a number of IP addresses a user signed-in from. Security analytics UI may be configured to utilize event data represented as predicted feature elements $y_3$ and $y_6$ (e.g., number of failed sign-in attempts and number of IP addresses a user signed-in from) for displaying reasons for anomalous sessions corresponding to the first predicted feature vector 330, and/or to display statistical information regarding related user behavior in the computer systems that provided the event data 112. In a similar manner as this method for returning reasons, reason generator 110 may be configured to return one or more reasons for an anomalous classification of each anomalously classified predicted feature vector 330 of the plurality of predicted feature vectors 330.

Figure 10:
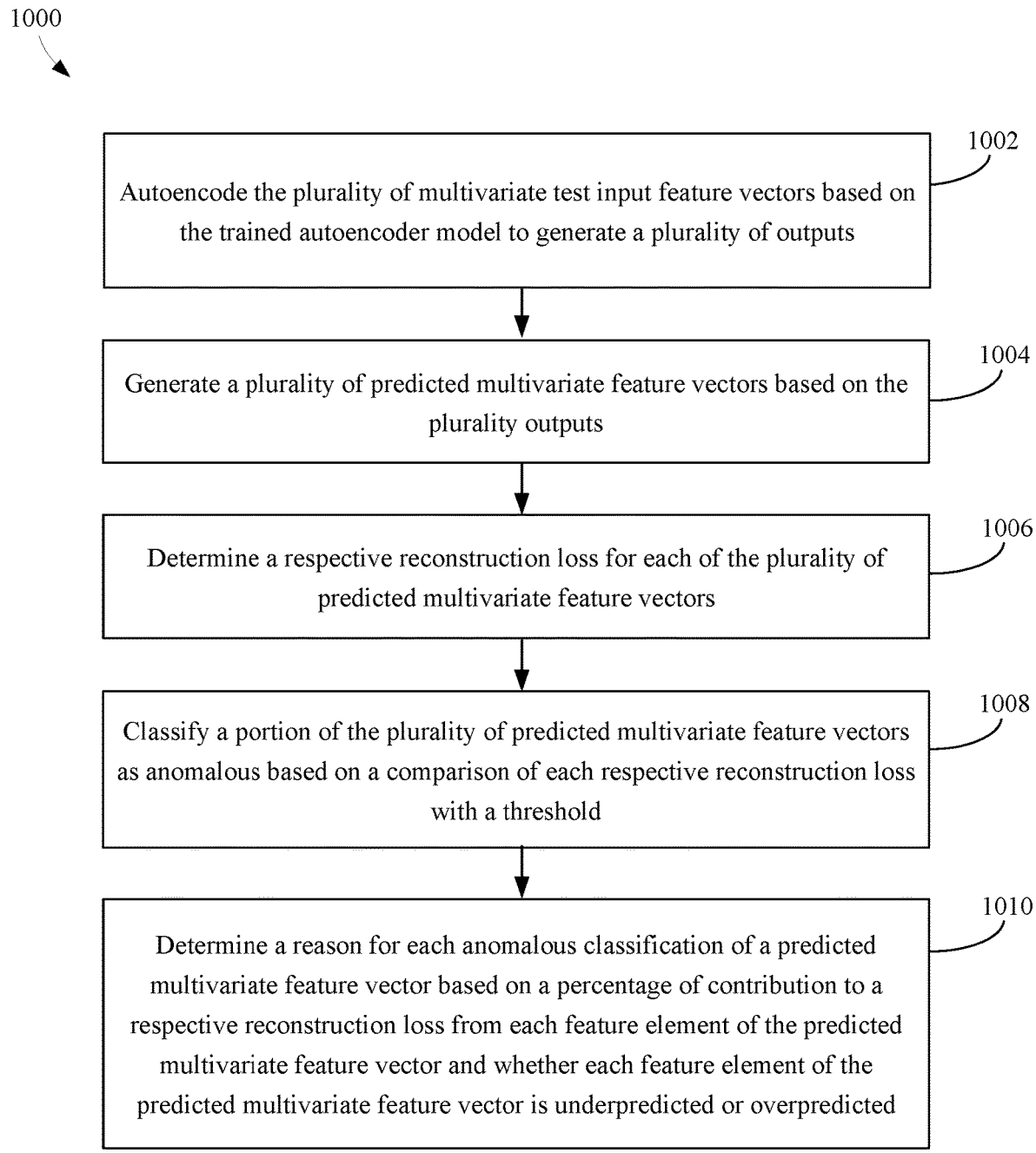
FIG. 10 is a flowchart of a method for determining reasons for a plurality of anomalous sessions represented by a plurality of respective test multivariate input feature vectors, according to an example embodiment.

Systems 100 and 300 may operate in various ways to perform their functions. For instance, FIG. 10 is a flowchart 1000 of a method for determining reasons for a plurality of anomalous sessions represented by a plurality of respective multivariate test input feature vectors, according to an example embodiment. Flowchart 1000 may be performed according to flowchart 200 after step 206, and according to flowcharts 400-900 after step 402, as applied to a plurality of test user input feature vectors 316. For example, the steps of flowcharts 200 and 400-900 related to the first test input feature vector 316 and first predicted feature vector 330 for generating reason(s) for anomalies 118 may be applied to each of the plurality of input test feature vectors 316 and each of the plurality of predicted feature vectors 330. In an embodiment, system 100 and system 300 may operate according to flowchart 1000. Flowchart 1000 is described as follows with reference to FIGS. 1 and 3.

Flowchart 1000 begins with step 1002. In step 1002 a plurality of multivariate test input feature vectors may be autoencoded based on a trained autoencoder model to generate a plurality of outputs. For example, in a manner similar as the method described above with respect to step 502 (FIG. 5), trained autoencoder model 322 may be configured to autoencode each of the plurality of test input feature vectors 316, where each feature element of each of the plurality of test input feature vectors 316 may correspond to a respective type of event data (e.g., a count of failed sign-in logs, a count of number of IP addresses signed in from, etc.). A trained autoencoder model 322 may be configured to autoencode each of the plurality of test input feature vectors 316 into a respective bottleneck feature vector having fewer feature elements than the respective input feature vector, and then attempt to reconstruct (e.g., estimate or predict) the each of the plurality of test input feature vectors 316 from a respective bottleneck feature vector, to generate a respective output (e.g., a respective predicted feature vector 330).

In step 1004, a plurality of predicted multivariate feature vectors are generated based on the plurality outputs. For example, each of the plurality predicted feature vectors 330 may comprise feature elements corresponding to respective feature elements of the plurality of test input feature vectors 316. Moreover, each feature element of each predicted feature vector 330 may correspond to the same event data 112 as a respective feature element of a corresponding test input feature vector 316. In a manner similar as the method described above with respect to step 504 (FIG. 5) for a first predicted feature vector 316, trained autoencoder model 322 may be configured to generate a plurality of predicted feature vectors 330, each comprising an estimation of respective feature elements in a corresponding test input feature vector 316, based on the bottleneck feature vector.

In step 1006, a respective reconstruction loss score 332 is determined for each of the plurality of predicted multivariate feature vectors 330. For example, loss determiner 324 may be configured to compare each predicted feature vector 330 to a corresponding test input feature vector 316 and generate a reconstruction loss value (e.g., anomaly score) for each predicted feature vector 330 based on the respective comparison. In one embodiment, for each predicted feature vector 330, loss determiner 324 may be configured to determine the difference between each feature element of the predicted feature vector 330 to a respective feature element in a corresponding test input feature vector 316, and sum the differences for each pair of feature elements to output a reconstruction loss value for the feature vector 330, similar to the examples described with respect to step 506 (FIG. 5), and 602, (FIG. 6).

In step 1008, in a manner similar as the method described above with respect to step 508 (FIG. 5) for a first predicted multivariate feature vector 316, a portion of the plurality of predicted multivariate feature vectors 330 may be classified as anomalous (e.g., referred to as anomalous feature vectors) based on a comparison of the respective reconstruction loss of each of the plurality of predicted multivariate feature vectors 330 with an anomaly threshold value.

In step 1010, in a manner similar as the method described above with respect to steps 702-708 (FIG. 7) and percent contribution determiner 326, underprediction determiner 328, reason generator 110, and security analytics UI 120 (FIG. 3), for the first predicted multivariate feature vector 316, a reason(s) may be determined for each anomalous predicted multivariate feature vector 330 of the plurality of predicted multivariate feature vectors 330. The reason(s) may be determined for each anomalous predicted feature vector 330 based on a respective percentage of contribution 334 to a respective reconstruction loss from each feature element of the anomalous predicted feature vector 330 and whether each feature element of the anomalous predicted feature vector 330 is underpredicted or overpredicted (e.g., based on a respective underprediction flag 336 of each feature element). Reasons generator 110 may be configured to transmit the reason(s) for each of the anomalous predicted feature vectors 330 to security analytics UI 120. Security analytics UI 120 may be configured to indicate in a display that event data represented as the selected feature elements comprise reasons for anomalous sessions of the anomalous predicted feature vectors 330, and/or to display statistical information regarding related user behavior in the computer systems that provide event data 112.

III. Example Computer System Implementation

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

As noted herein, the embodiments described, including but not limited to, systems 100 and 300 along with any components and/or subcomponents thereof, as well any operations and portions of flowcharts/flow diagrams described herein and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), an application specific integrated circuit (ASIC), a trusted platform module (TPM), and/or the like. A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of computing devices provided herein are provided for purposes of illustration, and are not intended to be limiting. Embodiments may be implemented in further types of computer systems, as would be known to persons skilled in the relevant art(s).

Figure 11:
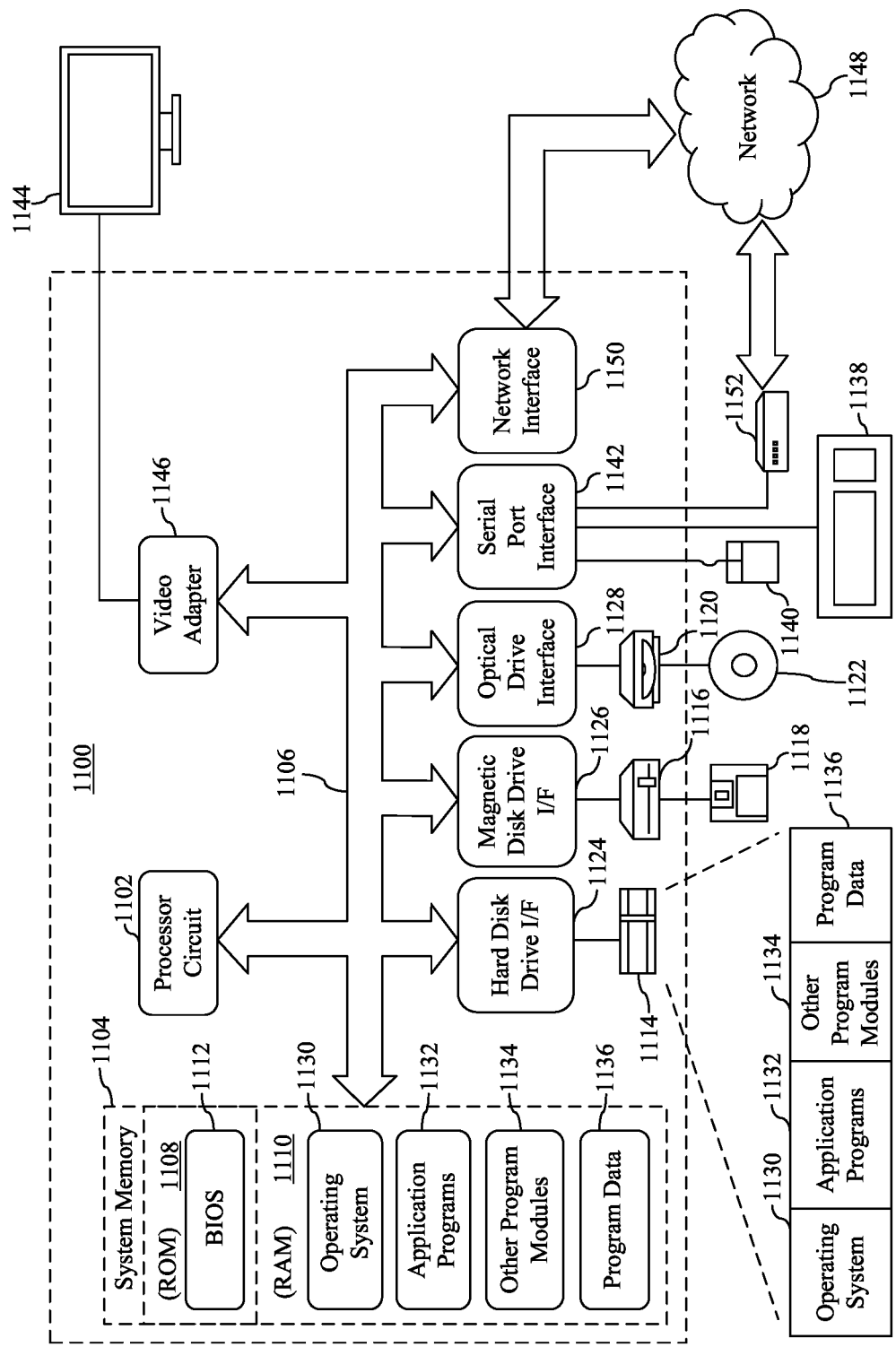
FIG. 11 is a block diagram of an example processor-based computer system that may be used to implement various embodiments.

FIG. 11 is a block diagram of an example processor-based computer system 1100 that may be used to implement various embodiments. Computing device(s) 102, may each include any type of computing device, mobile or stationary, such as a desktop computer, a server, a video game console, etc. For example, computing device(s) 102 may each be any type of mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as a Microsoft Windows® phone, an Apple iPhone, a phone implementing the Google® Android™ operating system, etc.), a wearable computing device (e.g., a head-mounted device including smart glasses such as Google® Glass™, Oculus Rift® by Oculus VR, LLC, etc.), a stationary computing device such as a desktop computer or PC (personal computer), a gaming console/system (e.g., Microsoft Xbox®, Sony Play Station®, Nintendo Wii® or Switch®, etc.), etc.

Computing device(s) 102 may each be implemented in one or more computing devices containing features similar to those of computing device 1100 in stationary or mobile computer embodiments and/or alternative features. The description of computing device 1100 provided herein is provided for purposes of illustration, and is not intended to be limiting. Embodiments may be implemented in further types of computer systems, as would be known to persons skilled in the relevant art(s).

As shown in FIG. 11, computing device 1100 includes one or more processors, referred to as processor circuit 1102, a system memory 1104, and a bus 1106 that couples various system components including system memory 1104 to processor circuit 1102. Processor circuit 1102 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1102 may execute program code stored in a computer readable medium, such as program code of operating system 1130, application programs 1132, other programs 1134, etc. Bus 1106 represents one or more of any of several types of bus structures, including a memory bus or memory controller, a peripheral bus, an accelerated graphics port, and a processor or local bus using any of a variety of bus architectures. System memory 1104 includes read only memory (ROM) 1108 and random-access memory (RAM) 1110. A basic input/output system 1112 (BIOS) is stored in ROM 1108.

Computing device 1100 also has one or more of the following drives: a hard disk drive 1114 for reading from and writing to a hard disk, a magnetic disk drive 1116 for reading from or writing to a removable magnetic disk 1118, and an optical disk drive 1120 for reading from or writing to a removable optical disk 1122 such as a CD ROM, DVD ROM, or other optical media. Hard disk drive 1114, magnetic disk drive 1116, and optical disk drive 1120 are connected to bus 1106 by a hard disk drive interface 1124, a magnetic disk drive interface 1126, and an optical drive interface 1128, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1130, one or more application programs 1132, other programs 1134, and program data 1136. Application programs 1132 or other programs 1134 may include, for example, computer program logic (e.g., computer program code or instructions) for implementing data retrieval manager 104, data aggregation engine 106, anomaly detection engine 108, reason generator 110, security analytics UI 120, model training manager 320, autoencoder model 322, loss determiner 324, anomaly detection engine 108, percent contribution determiner 326, underprediction determiner 328, and any one or more of flowcharts 200, 400, 500, 600, 700, 800, 900, 1000, (including any step thereof), and/or further embodiments described herein. Program data 1136 may include, event data 112, multivariate input feature vectors 114, anomalous predicted multivariate feature vectors 116, reasons for anomalies 118, multivariate training input feature vectors 314, multivariate test input feature vectors 316, predicted multivariate feature vectors 330, loss scores 332, percent contribution values 334 underprediction flags 336, and/or further embodiments described herein.

A user may enter commands and information into computing device 1100 through input devices such as keyboard 1138 and pointing device 1140. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1102 through a serial port interface 1142 that is coupled to bus 1106, but may be connected by other interfaces, such as a parallel port, game port, or a universal serial bus (USB).

A display screen 1144 is also connected to bus 1106 via an interface, such as a video adapter 1146. Display screen 1144 may be external to, or incorporated in computing device 1100. Display screen 1144 may display information, as well as being a user interface for receiving user commands and/or other information (e.g., by touch, finger gestures, virtual keyboard, etc.). In addition to display screen 1144, computing device 1100 may include other peripheral output devices (not shown) such as speakers and printers.

Computing device 1100 is connected to a network 1148 (e.g., the Internet) through an adaptor or network interface 1150, a modem 1152, or other means for establishing communications over the network. Modem 1152, which may be internal or external, may be connected to bus 1106 via serial port interface 1142, as shown in FIG. 11, or may be connected to bus 1106 using another interface type, including a parallel interface.

As used herein, the terms "computer program medium," "computer-readable medium," and "computer-readable storage medium" are used to refer to physical hardware media such as the hard disk associated with hard disk drive 1114, removable magnetic disk 1118, removable optical disk 1122, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1132 and other programs 1134) may be stored on the hard disk, magnetic disk, optical disk, ROM, RAM, or other hardware storage medium. Such computer programs may also be received via network interface 1150, serial port interface 1142, or any other interface type. Such computer programs, when executed or loaded by an application, enable computing device 1100 to implement features of embodiments discussed herein. Accordingly, such computer programs represent controllers of computing device 1100.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Examples and Advantages

In an embodiment, a system for providing reasons for classifying event data as anomalous comprises one or more processors and one or more memory devices that store program code of a first computer program to be executed by the one or more processors. The program code comprises a trained autoencoder model configured to autoencode a first test input feature vector having a plurality of feature elements, to generate a first output, where each feature element of the first test input feature vector corresponds to a respective type of event data. The trained autoencoder model is further configured to generate a first predicted feature vector based on the first output, the first predicted feature vector comprising feature elements corresponding to those of the first test input feature vector. The system further comprises a loss determiner that is configured to determine a reconstruction loss for the first predicted feature vector relative to the first test input feature vector. The system further comprises a percent contribution determiner that is configured to, in response to the first predicted feature vector being classified as anomalous based on its reconstruction loss, determine, for each feature element of the first predicted feature vector, a percentage of contribution to the reconstruction loss. The system further comprises an underprediction determiner that is configured to determine, for each feature element of the first predicted feature vector, whether the feature element is underpredicted or overpredicted. The system further comprises a reason generator configured to select a feature element of the first predicted feature vector based on the determined percentage of contribution to the reconstruction loss and the underpredicted or overpredicted determination, and return a reason for the anomalous classification of the first predicted feature vector that is based on the selected feature element.

In an embodiment, a system for classifying event data as anomalous comprises one or more processors and one or more memory devices that store program code of a first computer program to be executed by the one or more processors. The program code comprises a trained autoencoder model configured to autoencode a first multivariate input feature vector to generate a first output, each feature element of the first multivariate input feature vector corresponding to a respective type of event data. The program code is further configured to generate a first predicted multivariate feature vector based on the first output. The first predicted multivariate feature vector comprises feature elements corresponding to those of the first multivariate input feature vector. A reason generator configured to, in response to classifying the first predicted multivariate feature vector as anomalous based on its reconstruction loss, a feature element of the first predicted multivariate feature vector is selected as a likely cause for the anomalous classification.

In an embodiment of the foregoing system, a percent contribution determiner is configured to, in response to the first predicted multivariate feature vector being classified as anomalous based on its reconstruction loss, determine, for each feature element of the first predicted multivariate feature vector, a percentage of contribution to the reconstruction loss. An underprediction determiner configured to determine, for each feature element of the first predicted multivariate feature vector, whether the feature element is underpredicted or overpredicted. The feature element of the first predicted multivariate feature vector is selected as the likely cause for the anomalous classification based on the determined percentage of contribution to the reconstruction loss and the underpredicted or overpredicted determination.

In an embodiment of the foregoing system, a reason generator is configured to return a reason for the anomalous classification of the first predicted multivariate feature vector based on the selected feature element.

In an embodiment of the foregoing system, the first multivariate test input feature vector and the first predicted multivariate feature vector are associated with a corresponding user and a corresponding user session.

In an embodiment of the foregoing system, the system further comprises a data retrieval manager that is configured to, prior to autoencoding the first test input feature vector based on the trained autoencoder model, retrieve event data based on event logs. The system further comprises a data aggregation engine that is configured to aggregate the event data and generate a plurality of multivariate input feature vectors comprising multivariate training input feature vectors and multivariate test input feature vectors, where the plurality of multivariate test input feature vectors comprises the first multivariate test input feature vector. The system further comprises a model training manager configured to train the autoencoder model based on the multivariate training input feature vectors to generate the trained autoencoder model.

In an embodiment of the foregoing system, the trained autoencoder model is further configured to autoencode the plurality of multivariate test input feature vectors to generate a plurality of outputs, and generate a plurality of predicted multivariate feature vectors based on the plurality outputs. The loss determiner is further configured to determine a respective reconstruction loss for each of the plurality of predicted multivariate feature vectors. The system further comprises an anomaly detection engine that is configured to classify a portion of the plurality of predicted multivariate feature vectors as anomalous based on a comparison of each respective reconstruction loss with a threshold. The percent contribution determiner is further configured to determine a percentage of contribution to a respective reconstruction loss from each feature element of each anomalous predicted multivariate feature vector. The underprediction determiner is further configured to determine whether each feature element of each anomalous predicted multivariate feature vector is underpredicted or overpredicted. The reason generator is further configured to determine a reason for each anomalous classification of a predicted multivariate feature vector based on the percentage of contribution to a respective reconstruction loss from each feature element of the anomalous predicted multivariate feature vector and whether each feature element of the anomalous predicted multivariate feature vector is underpredicted or overpredicted.

In an embodiment of the foregoing system, the loss determiner is further configured to determine the reconstruction loss based on a summation of differences between a value of each feature element of the first multivariate test input feature vector and a value of each respective feature element of the first predicted multivariate feature vector.

In an embodiment of the foregoing system, the percent contribution determiner is further configured to determine a difference between a value of a feature element of the first multivariate test input feature vector and a value of a corresponding feature element of the first predicted multivariate feature vector relative to the reconstruction loss of the first predicted multivariate feature vector relative to the first multivariate test input feature vector, to determine the percentage of contribution to the reconstruction loss.

In an embodiment of the foregoing system, a feature element of the first predicted multivariate feature vector is determined to be overpredicted where the feature element's value is greater than a value of a corresponding feature element of the first multivariate test input feature vector.

In an embodiment of the foregoing system, the first multivariate test input feature vector comprises a multivariate feature vector or a multivariate time series of feature vectors.

In an embodiment of the foregoing system, the type of event data comprises data logged from user sign-in sessions or data logged from application sessions.

In an embodiment, a method for providing reasons for classifying event data as anomalous comprises autoencoding a first test input feature vector that has a plurality of feature elements, based on a trained autoencoder model to generate a first output. Each feature element of the first test input feature vector corresponds to a respective type of event data. A first predicted feature vector may be generated based on the first output and the first predicted feature vector may comprise feature elements corresponding to the feature elements of the first test input feature vector. A reconstruction loss may be determined for the first predicted feature vector relative to the first test input feature vector. In response to classifying the first predicted feature vector as anomalous based on the determined reconstruction loss, for each feature element of the first predicted feature vector, a percentage of contribution to the reconstruction loss may be determined. For each feature element of the first predicted feature vector, it may be determined whether the feature element is underpredicted or overpredicted. A feature element of the first predicted feature vector may be selected based on the determined percentage of contribution to the reconstruction loss and the underpredicted or overpredicted determination. A reason for the anomalous classification of the first predicted feature vector that is based on the selected feature element may be returned.

In an embodiment, a method for classifying event data as anomalous comprises autoencoding a first multivariate input feature vector based on a trained autoencoder model to generate a first output Each feature element of the first multivariate input feature vector corresponds to a respective type of event data. A first predicted multivariate feature vector is generated based on the first output. The first predicted multivariate feature vector comprises feature elements corresponding to feature elements of the first multivariate input feature vector. In response to classifying the first multivariate predicted feature vector as anomalous based on its reconstruction loss select a feature element of the first multivariate predicted feature vector as a likely cause for the anomalous classification.

In an embodiment of the foregoing method, in response to classifying the first multivariate predicted feature vector based on its reconstruction loss, for each feature element of the first multivariate predicted feature vector, a percentage of contribution to the reconstruction loss is determined. For each feature element of the first predicted feature vector, it is determined whether the feature element is underpredicted or overpredicted. The feature element of the first multivariate predicted feature vector is selected as the likely cause for the anomalous classification based on the determined percentage of contribution to the reconstruction loss and the underpredicted or overpredicted determination.

In an embodiment of the foregoing method, a reason is returned for the anomalous classification of the first multivariate predicted feature vector based on the selected feature element.

In an embodiment of the foregoing method, the first multivariate test input feature vector and the first predicted multivariate feature vector are associated with a corresponding user and a corresponding user session.

In an embodiment of the foregoing method, prior to autoencoding the first multivariate test input feature vector based on the trained autoencoder model, event data based on event logs may be retrieved. The event data may be aggregated into a plurality of multivariate input feature vectors comprising multivariate training input feature vectors and multivariate test input feature vectors. The plurality of multivariate test input feature vectors may comprise the first multivariate test input feature vector. The autoencoder model may be trained based on the multivariate training input feature vectors to generate the trained autoencoder model.

In an embodiment of the foregoing method, the plurality of multivariate test input feature vectors may be autoencoded based on the trained autoencoder model to generate a plurality of outputs. A plurality of predicted multivariate feature vectors may be generated based on the plurality outputs. A respective reconstruction loss may be determined for each of the plurality of predicted multivariate feature vectors. A portion of the plurality of predicted multivariate feature vectors may be classified as anomalous based on a comparison of each respective reconstruction loss with a threshold. A reason for each anomalous classification of a predicted multivariate feature vector may be determined based on a percentage of contribution to a respective reconstruction loss from each feature element of the predicted multivariate feature vector and whether each feature element of the predicted multivariate feature vector is underpredicted or overpredicted.

In an embodiment of the foregoing method, the reconstruction loss is determined based on a summation of differences between a value of each feature element of the first multivariate test input feature vector and a value of each respective feature element of the first predicted multivariate feature vector.

In an embodiment of the foregoing method, said determining a percentage of contribution to the reconstruction loss comprises determining a difference between a value of a feature element of the first multivariate test input feature vector and a value of a corresponding feature element of the first predicted multivariate feature vector, relative to the reconstruction loss of the first predicted multivariate feature vector relative to the first multivariate test input feature vector.

In an embodiment of the foregoing method, a feature element of the first multivariate predicted feature vector is determined to be overpredicted where the feature element's value is greater than a value of a corresponding feature element of the first multivariate test input feature vector.

In an embodiment of the foregoing method, the first multivariate test input feature vector comprises a multivariate feature vector or a multivariate time series of feature vectors.

In an embodiment, a computer readable medium having program code recorded thereon that when executed by at least one processor causes the at least one processor to perform a method for classifying event data as anomalous. The method comprises autoencoding a first multivariate input feature vector based on a trained autoencoder model to generate a first output. Each feature element of the first multivariate input feature vector corresponds to a respective type of event data. A first predicted multivariate feature vector is generated based on the first output. The first predicted multivariate feature vector comprises feature elements corresponding to feature elements of the first multivariate input feature vector. In response to classifying the first multivariate predicted feature vector as anomalous based on its reconstruction loss, a feature element of the first multivariate predicted feature vector is selected as a likely cause for the anomalous classification.

In an embodiment, a computer readable medium having program code recorded thereon that when executed by at least one processor causes the at least one processor to perform a method for providing reasons for classifying event data as anomalous. The method comprises autoencoding a first test input feature vector that has a plurality of feature elements based on a trained autoencoder model to generate a first output. Each feature element of the first test input feature vector corresponds to a respective type of event data. A first predicted feature vector is generated based on the first output. The first predicted feature vector comprises feature elements corresponding to the feature elements of the first test input feature vector. A reconstruction loss is determined for the first predicted feature vector relative to the first test input feature vector. In response to classifying the first predicted feature vector as anomalous based on the determined reconstruction loss, for each feature element of the first predicted feature vector, a percentage of contribution to the reconstruction loss is determined. For each feature element of the first predicted feature vector, it is determined whether the feature element is underpredicted or overpredicted. A feature element of the first predicted feature vector is determined based on the determined percentage of contribution to the reconstruction loss and the underpredicted or overpredicted determination. A reason for the anomalous classification of the first predicted feature vector based on the selected feature element is returned.

In an embodiment of the foregoing computer readable medium, the method further comprises, prior to autoencoding the first multivariate test input feature vector based on the trained autoencoder model, event data based on event logs is retrieved. The event data may be aggregated into a plurality of input feature vectors comprising training input feature vectors and test input feature vectors. The plurality of test input feature vectors comprises the first test input feature vector. The autoencoder model may be trained based on the training input feature vectors to generate the trained autoencoder model.

In an embodiment of the foregoing computer readable medium, the method further comprises autoencoding the plurality of test input feature vectors based on the trained autoencoder model to generate a plurality of outputs, generating a plurality of predicted feature vectors based on the plurality outputs, determining a respective reconstruction loss for each of the plurality of predicted feature vectors, and classifying a portion of the plurality of predicted feature vectors as anomalous based on a comparison of each respective reconstruction loss with a threshold. A reason for each anomalous classification of a predicted feature vector may be determined based on: a percentage of contribution to a respective reconstruction loss from each feature element of the predicted feature vector, and whether each feature element of the predicted feature vector is underpredicted or overpredicted.

V. Conclusion

While various embodiments of the present application have been described above, it should be understood that they have been presented by way of example only, and not limitation. It will be understood by those skilled in the relevant art(s) that various changes in form and details may be made therein without departing from the spirit and scope of the application as defined in the appended claims. Accordingly, the breadth and scope of the present application should not be limited by any of the above-described exemplary embodiments, but should be defined only in accordance with the following claims and their equivalents.

What is claimed is:

1. A system for classifying event data as anomalous, the system comprising:
   a processor; and
   a memory device that stores program code to be executed by the processor, the program code comprising:
      a trained autoencoder model configured to:
         autoencode a multivariate input feature vector to generate a first output, the multivariate input feature vector comprising input feature elements associated with event data; and
         generate a predicted multivariate feature vector based on the first output, the predicted multivariate feature vector comprising predicted feature elements corresponding to the input feature elements of the multivariate input feature vector;
      an underprediction determiner configured to:
         determine whether a first predicted feature element of the predicted multivariate feature vector is an underprediction of a corresponding input feature element of the multivariate input feature vector;
      a percent contribution determiner configured to:
         in response to the predicted multivariate feature vector being classified as anomalous based on a reconstruction loss associated with the predicted multivariate feature vector, determine a percentage of contribution to the reconstruction loss by the first predicted feature element; and
      a reason generator configured to:
         in response to classifying the predicted multivariate feature vector as anomalous based on the reconstruction loss, select the first predicted feature element as a likely cause for the anomalous classification based on at least one of: a determination that the first predicted feature element is an underprediction of the corresponding input feature element, or the percentage of contribution to the reconstruction loss by the first predicted feature element.

2. The system of claim 1, wherein the reason generator further configured to:
return a reason for the anomalous classification of the predicted multivariate feature vector based on the first predicted feature element.

3. The system of claim 1, wherein the multivariate input feature vector and the predicted multivariate feature vector are associated with a corresponding user and a corresponding user session.

4. The system of claim 1, wherein the program code further comprises:
a data retrieval manager configured to:
prior to autoencoding the multivariate input feature vector based on the trained autoencoder model, retrieve event data based on event logs;
a data aggregation engine configured to:
aggregate the event data and generate a plurality of multivariate training input feature vectors and a plurality of multivariate test input feature vectors, wherein the plurality of multivariate test input feature vectors comprises the multivariate input feature vector; and
a model training manager configured to:
train the autoencoder model based on the plurality of multivariate training input feature vectors to generate the trained autoencoder model.

5. The system of claim 4, wherein the program code further comprises
an anomaly detection engine configured to:
classify the predicted multivariate feature vector as anomalous based on a comparison of the reconstruction loss with a threshold.

6. The system of claim 1, wherein the program code further comprises a loss determiner configured to:
determine the reconstruction loss based on a summation of differences between a value of each input feature element of the multivariate input feature vector and a value of each corresponding predicted feature element of the predicted multivariate feature vector.

7. The system of claim 1, wherein the first predicted feature element is determined to be an underprediction of the corresponding input feature element when a value of the first predicted feature element is less than a value of the corresponding input feature element.

8. The system of claim 1, wherein the multivariate input feature vector comprises at least one of:
a multivariate feature vector, or
a multivariate time series of feature vectors.

9. The system of claim 1, wherein the event data comprises at least one of:
data logged from user sign-in sessions; or
data logged from application sessions.

10. The system of claim 1, wherein, to determine the percentage of contribution to the reconstruction loss by the first predicted feature element, the percent contribution determiner is further configured to:
determine a difference between a value of the first predicted feature element and a value of the corresponding input feature element; and
divide the difference by the reconstruction loss associated with the predicted multivariate feature vector to determine the percentage of contribution to the reconstruction loss by the first predicted feature element.

11. A method for classifying event data as anomalous, the method comprising:
autoencoding a multivariate input feature vector based on a trained autoencoder model to generate a first output, the multivariate input feature vector comprising input feature elements associated with event data; and
generating a predicted multivariate feature vector based on the first output, the predicted multivariate feature vector comprising predicted feature elements corresponding to the input feature elements of the multivariate input feature vector; and
in response to classifying the multivariate predicted feature vector as anomalous based on a reconstruction loss associated with the predicted multivariate feature vector:
determining whether a first predicted feature element of the predicted multivariate feature vector is an underprediction of a corresponding input feature element of the multivariate input feature vector;
determining a percentage of contribution to the reconstruction loss by the first predicted feature element; and
selecting the first predicted feature element as a cause for the anomalous classification based on at least one of: a determination that the first predicted feature element is an underprediction of the corresponding input feature element, or the percentage of contribution to the reconstruction loss by the first predicted feature element.

12. The method of claim 11, further comprising:
returning a reason for the anomalous classification of the multivariate predicted feature vector based on the first predicted feature element.

13. The method of claim 11, wherein the multivariate input feature vector and the predicted feature vector are associated with a corresponding user and a corresponding user session.

14. The method of claim 11, further comprising:
prior to autoencoding the multivariate input feature vector based on the trained autoencoder model, performing:
retrieving event data based on event logs;
aggregating the event data into a plurality of training input feature vectors and a plurality of test input feature vectors, wherein the plurality of test input feature vectors comprises the multivariate input feature vector; and
training the autoencoder model based on the training input feature vectors to generate the trained autoencoder model.

15. The method of claim 14, further comprising:
classifying the predicted feature vector as anomalous based on a comparison of the reconstruction loss with a threshold.

16. The method of claim 11, wherein the multivariate input feature vector comprises at least one of:
a multivariate feature vector, or
a multivariate time series of feature vectors.

17. The method of claim 11, wherein said determining the percentage of contribution to the reconstruction loss by the first predicted feature element comprises:
determining a difference between a value of the first predicted feature element and a value of the corresponding input feature element; and
dividing the difference by the reconstruction loss associated with the predicted multivariate feature vector to determine the percentage of contribution to the reconstruction loss by the first predicted feature element.

18. The method of claim 11, wherein the event data comprises at least one of:
   data logged from user sign-in sessions; or
   data logged from application sessions.

19. A computer-readable storage medium having program code recorded thereon that when executed by at least one processor causes the at least one processor to perform a method for classifying event data as anomalous, the method comprising:
   autoencoding a multivariate input feature vector based on a trained autoencoder model to generate a first output, the multivariate input feature vector comprising input feature elements associated with event data; and
   generating a predicted multivariate feature vector based on the first output, the predicted multivariate feature vector comprising predicted feature elements corresponding to the input feature elements of the multivariate input feature vector; and
   in response to classifying the multivariate predicted feature vector as anomalous based on a reconstruction loss associated with the predicted multivariate feature vector:
      determining whether a first predicted feature element of the predicted multivariate feature vector is an underprediction of a corresponding input feature element of the multivariate input feature vector;
      determining a percentage of contribution to the reconstruction loss by the first predicted feature element; and
      selecting the first predicted feature element as a cause for the anomalous classification based on at least one of: a determination that the first predicted feature element is an underprediction of the corresponding input feature element, or the percentage of contribution to the reconstruction loss by the first predicted feature element.

20. The computer-readable storage medium of claim 19, wherein said determining the percentage of contribution to the reconstruction loss by the first predicted feature element comprises:
   determining a difference between a value of the first predicted feature element and a value of the corresponding input feature element; and
   dividing the difference by the reconstruction loss associated with the predicted multivariate feature vector to determine the percentage of contribution to the reconstruction loss by the first predicted feature element.

* * * * *